(12) United States Patent
Ponnuswamy

(10) Patent No.: US 11,916,791 B2
(45) Date of Patent: Feb. 27, 2024

(54) MODIFYING DATA PACKET TRANSMISSION STRATEGY BASED ON TRANSMISSION CONTROL PROTOCOL STAGE

(71) Applicant: CLOUDBRINK INC., Sunnyvale, CA (US)

(72) Inventor: Subbu Ponnuswamy, Saratoga, CA (US)

(73) Assignee: CLOUDBRINK INC., Sunnyvale, CA (US)

( * ) Notice: Subject to any disclaimer, the term of this patent is extended or adjusted under 35 U.S.C. 154(b) by 90 days.

(21) Appl. No.: 17/559,468

(22) Filed: Dec. 22, 2021

(65) Prior Publication Data

US 2023/0198903 A1 Jun. 22, 2023

(51) Int. Cl.
*H04L 47/12* (2022.01)
*H04L 47/2466* (2022.01)
*H04L 69/163* (2022.01)

(52) U.S. Cl.
CPC .......... *H04L 47/12* (2013.01); *H04L 47/2466* (2013.01); *H04L 69/163* (2013.01)

(58) Field of Classification Search
CPC ... H04L 47/12; H04L 47/2466; H04L 69/163; H04L 69/16; H04L 47/193; H04L 47/27; H04L 47/283
See application file for complete search history.

(56) References Cited

U.S. PATENT DOCUMENTS

| | | | | |
|---|---|---|---|---|
| 9,246,817 | B1* | 1/2016 | Vivanco | H04L 47/286 |
| 2010/0085892 | A1 | 4/2010 | Kouhi | |
| 2016/0380898 | A1* | 12/2016 | Englund | H04L 47/193 |
| | | | | 370/235 |
| 2017/0331753 | A1* | 11/2017 | Li | H04L 47/27 |
| 2018/0123943 | A1 | 5/2018 | Lee et al. | |
| 2018/0309636 | A1 | 10/2018 | Strom et al. | |
| 2020/0396169 | A1* | 12/2020 | Tan | H04L 47/2441 |
| 2023/0010512 | A1* | 1/2023 | Sharma | H04L 47/25 |

* cited by examiner

*Primary Examiner* — Mandish K Randhawa
(74) *Attorney, Agent, or Firm* — Invoke

(57) ABSTRACT

Techniques for modifying data packet transmission strategies for a data packet transmitted through a network are disclosed. A node identifies a TCP stage of a data packet flow associated with a data packet received by the node. The node identifies additional characteristics associated with the data packet, such as a duration of the data packet flow to which the data packet belongs. The node modifies a transmission strategy of the data packet based on the TCP stage associated with the data packet and one or more additional characteristics of the data packet. The node modifies the transmission strategy for the data packet by increasing an aggressiveness of the transmission strategy or decreasing the aggressiveness of the transmission strategy. A more aggressive transmission strategy employs more proactive data packet acceleration techniques than a less aggressive transmission strategy.

20 Claims, 9 Drawing Sheets

US 11,916,791 B2

MODIFYING DATA PACKET TRANSMISSION STRATEGY BASED ON TRANSMISSION CONTROL PROTOCOL STAGE

TECHNICAL FIELD

The present disclosure relates to modifying transmission strategy of data packets based on a transmission control protocol (TCP) stage of a data packet flow to which the data packets belong. Specifically, the present disclosure relates to determining a TCP stage associated with a data packet at a node in a network. The node modifies an aggressiveness level of a data packet transmission strategy for transmitting the data packet based on the TCP stage.

BACKGROUND

Data transmission networks span the globe to connect users to remote servers running applications accessible to the users. A network may include one or more intermediate nodes between the user at one end of the network and an end server at another end of the network. The end server may store or execute the application being run by the user.

Transmission control protocol (TCP) is a protocol for managing traffic in a network. It is the primary mechanism for managing congestion on the Internet. TCP manages congestion in data traffic using two data transmission stages: slow start and congestion avoidance. When a data packet flow is initiated, the data packets are managed using slow start. In the slow start stage, a source node that generates the data packet flow manages a number of data packets that may be transmitted to a destination prior to receiving an acknowledgement from the destination. The source node manages the number of data packets that may be transmitted towards the destination using a congestion window (CWND). Initially, CWND is set to an initial value, such as 2. The source node transmits the number of packets indicated by CWND and waits to receive an acknowledgement from the destination. Upon receiving the acknowledgement, the source node increases the value of CWND. The source node may double the value of CWND, such as from 2 to 4, from 4 to 8, or from 8 to 16, and transmits the number of packets indicated by CWND to the destination. The source node repeatedly increases CWND based on repeatedly receiving acknowledgements from the destination until a maximum CWND is reached. Upon reaching the maximum CWND, the source node enters a congestion avoidance TCP stage.

In the congestion avoidance stage, the source node maintains the transmission of a number of data packets up to the CWND prior to receiving an acknowledgement. If an acknowledgement is not received within a certain period of time, the source node resets the value for CWND to the initial value. The source node re-enters the slow-start stage.

In many applications, including web-based applications, a data transfer is made up of tens or hundreds of short-lived data transfers. For example, a web page may include one hundred different elements to be rendered, such as text, graphics, and images. Each of the separate elements may be a short-lived data transfer. A short-lived data transfer may be completed before the TCP stage associated with the data transfer leaves the slow-start stage. As a result, much or all of the short-lived data transfer is executed with a bandwidth that is limited by the TCP slow start stage.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1A:
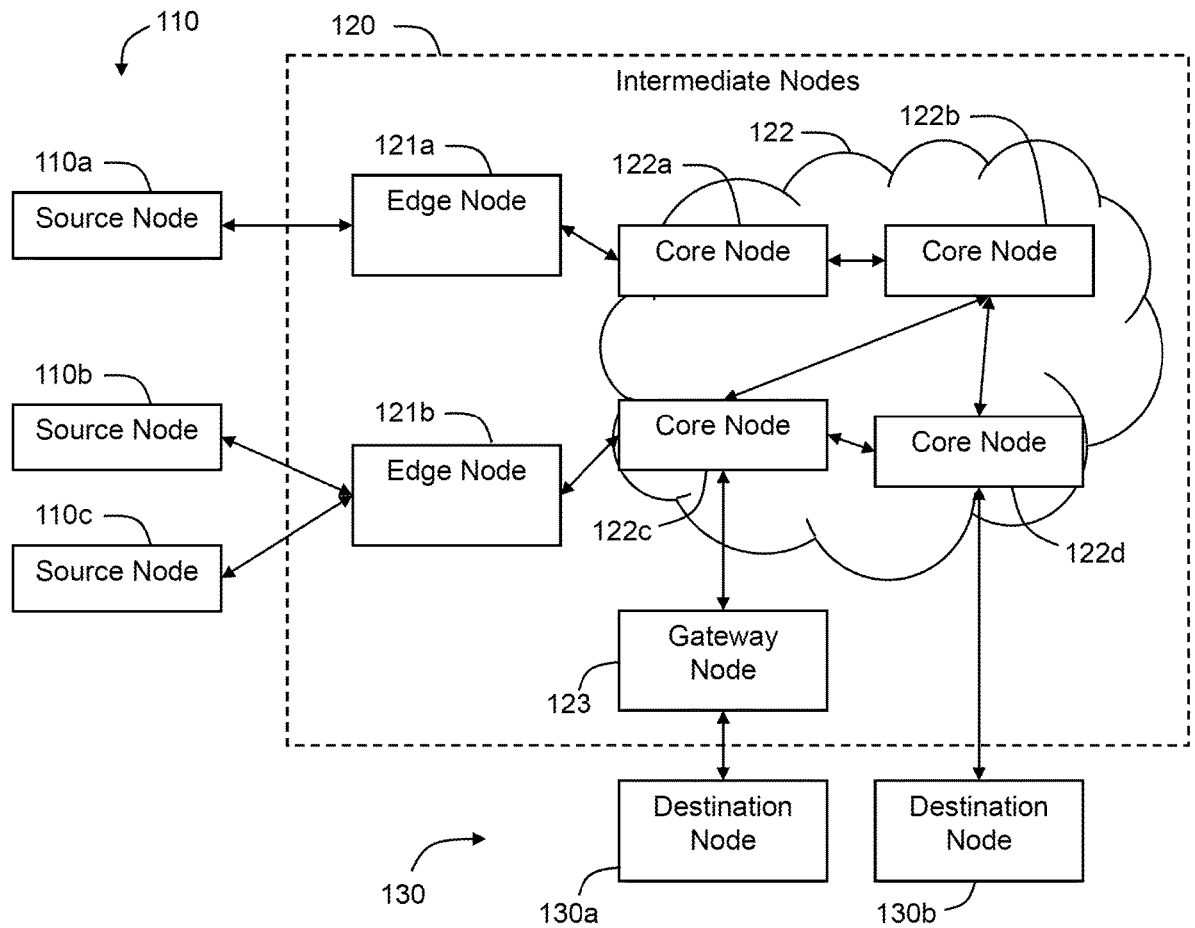
FIGS. 1A and 1B illustrate a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. MODIFICATION OF PACKET TRANSMISSION STRATEGIES BY A NETWORK NODE
4. EXAMPLE EMBODIMENT OF IMPLEMENTING A FAIRNESS STRATEGY FOR TRANSMITTING DATA PACKETS
5. EXAMPLE EMBODIMENT OF SELECTING DATA PACKET ACCELERATION TECHNIQUES BY A SOURCE NODE IN A NETWORK
6. EXAMPLE EMBODIMENT OF SELECTING A DATA PACKET TRANSMISSION STRATEGY
7. EXAMPLE EMBODIMENT OF DATA PACKET
8. TRAINING A MACHINE LEARNING MODEL
9. EXAMPLE EMBODIMENT OF MODIFICATION OF PACKET TRANSMISSION STRATEGY BY AN INTERMEDIATE NODE
10. COMPUTER NETWORKS AND CLOUD NETWORKS
11. MISCELLANEOUS; EXTENSIONS
12. HARDWARE OVERVIEW

1. General Overview

One or more embodiments modify the transmission strategy for transmitting a data packet based on a TCP stage of a data packet flow to which the data packet belongs. A network node may identify the TCP stage of the data packet based on a congestion window (CWND) associated with the data packet. The network node may modify the transmission strategy of the data packet, for example, based on the TCP stage in combination with one or more additional characteristics of the data packet. For example, the network node may modify the transmission strategy based on the TCP stage and an estimated duration of the data packet flow including the data packet or a position of the data packet within the data packet flow.

In one or more embodiments, a system modifies an aggressiveness of a data packet transmission strategy based on the TCP stage of a data packet flow associated with the data packet. Generally, a more aggressive data packet transmission strategy employs a greater ratio of proactive-to-reactive data packet acceleration techniques. Proactive data packet acceleration techniques utilize network resources to prevent data transmission failures. Conversely, a less aggressive data packet transmission strategy employs a lesser ratio of proactive-to-reactive data packet acceleration techniques. Reactive data packet acceleration techniques respond to detected data packet transmission failures after they occur to correct the failures. Proactive techniques include duplication of data packets, piggybacking of one data packet onto another (or combining data packets), transmitting data packets along more than one data path towards a destination node, and forward error correction (FEC). Reactive techniques include re-transmission of data packets and jitter-smoothing by buffering data packets.

In one or more embodiments, a system increases an aggressiveness of a data packet transmission strategy based on one or more criteria including: a data packet flow being in a slow start TCP stage, a particular data packet being at an end of a data packet flow, and a particular data packet flow being a short-lived data packet flow. An example of a short-lived data packet flow is a data packet flow that has a length shorter than a number of packets transmitted in a full slow-start TCP stage. The system decreases an aggressiveness of the data packet transmission strategy based on one or more criteria including: the data packet flow being in a congestion avoidance TCP stage, the data packet flow being a long-lived data packet flow, and the data packet not being at an end of the data packet flow.

In one or more embodiments, a data communications network includes multiple different segments having different data transmission methods. For example, a system may include a source node connected to a Wi-Fi network, a series of intermediate nodes utilizing broadband, 4G, 5G, and backbone data transmission methods. In one or more embodiments, one or more nodes are positioned at transitions between two different segments having two different data transmission methods. The nodes implement data packet acceleration techniques based on the particular data transmission method associated with the downstream segment to maximize end-to-end data transmission performance of a TCP-type data packet flow.

In one or more embodiments, a source node in a data network, where a data packet flow is generated, identifies the state of the TCP session. In addition, the source node or an intermediate node may determine if the data packet flow is a short-lived or long-lived data packet flow. The node may use historical knowledge to determine if the data packet flow is a short-lived or long-lived data packet flow. For example, the node may identify the flow as short-lived or long-lived based on: a user or application originating the data packet flow, a server originating the data packet flow, and a destination to which the data packet flow is directed. The system may apply machine learning to identify the data packet flow as short-lived or long-lived based on these and additional criteria.

In one or more embodiments, an intermediate network node along a transmission path between a source network node and a destination network node modifies the data transmission strategy for a data packet. The intermediate network node may include one data packet queue for queuing data packets associated with short-lived data packet flows and another data packet queue for queueing data packets associated with long-lived data packet flows. The intermediate network node may interleave data packets of short-lived data packet flows among data packets of long-lived data packet flows. The intermediate network node may apply different data transmission strategies to the data packets associated with the short-lived data packet flows and the data packets associated with the long-lived data packet flows. In one or more embodiments, the system modifies data packet acceleration techniques for short-lived data packet flows and long-lived data packet flows to: (1) maximize a data packet transmission time, and (2) maintain a policy of fairness in transmitting both the short-lived data packet flows and the long-lived data packet flows. A fairness policy may include ensuring that data packet acceleration techniques applied to short-lived data packet flows do not result in delays for the long-lived data packet flows exceeding a threshold. For example, the system may implement data packet acceleration techniques to the short-lived data packet flows such that a difference in a delay metric between the short-lived data packet flows and the long-lived data packet flows does not exceed a predetermined percentage.

In one embodiment, a system includes a source node, a plurality of intermediate nodes, and a destination node. The source node and the plurality of intermediate nodes analyzes packet characteristics of a data packet in a data flow. In addition, the source node and the plurality of intermediate nodes modify data packet acceleration techniques applied to data packets to: (1) maximize a data packet transmission time, and (2) maintain a policy of fairness in transmitting both the short-lived data packet flows and the long-lived data packet flows.

In one or more embodiments, "history" information is carried by each packet header. The history information identifies the experience of the packet thus far (such as delay, jitter, or retransmission). In addition, TCP stage information, such as the CWND value may be stored in the packet header. In addition, the packet header may store information identifying a location of the respective packet in a corresponding data packet flow. Each intermediate node along a transmission path may update the history information. Accordingly, each intermediate node along the transmission path may treat the packet differently based on what the packet has encountered so far during transmission.

One or more embodiments employ a machine learning model to generate a data transmission strategy. The system may train the machine learning model with attributes of data packets, including TCP stages associated with the data packets, whether the data packets are short-lived or long-lived, and a location of a particular data packet within a data packet flow. The system may train the machine learning model to recommend or employ one or more proactive or reactive data packet acceleration techniques based on the attributes of the data packets.

One or more embodiments monitor changes to the congestion window to ensure the changes to the congestion window are deterministic. For example, a source node may apply a TCP protocol to increase the size of the congestion window for a data packet flow based on receiving acknowledgement packets from a destination node. The source node may selectively apply packet acceleration techniques to the data packet flows to increase the likelihood that the source node will repeatedly increase the size of the congestion window for short-lived data packet flows.

2. System Architecture

A data transmission system analyzes network characteristics and packet attributes of packets traveling through the network. The system modifies packet transmission characteristics by an intermediate node in the network to achieve a desired quality-of-service (QoS).

Figure 1B:
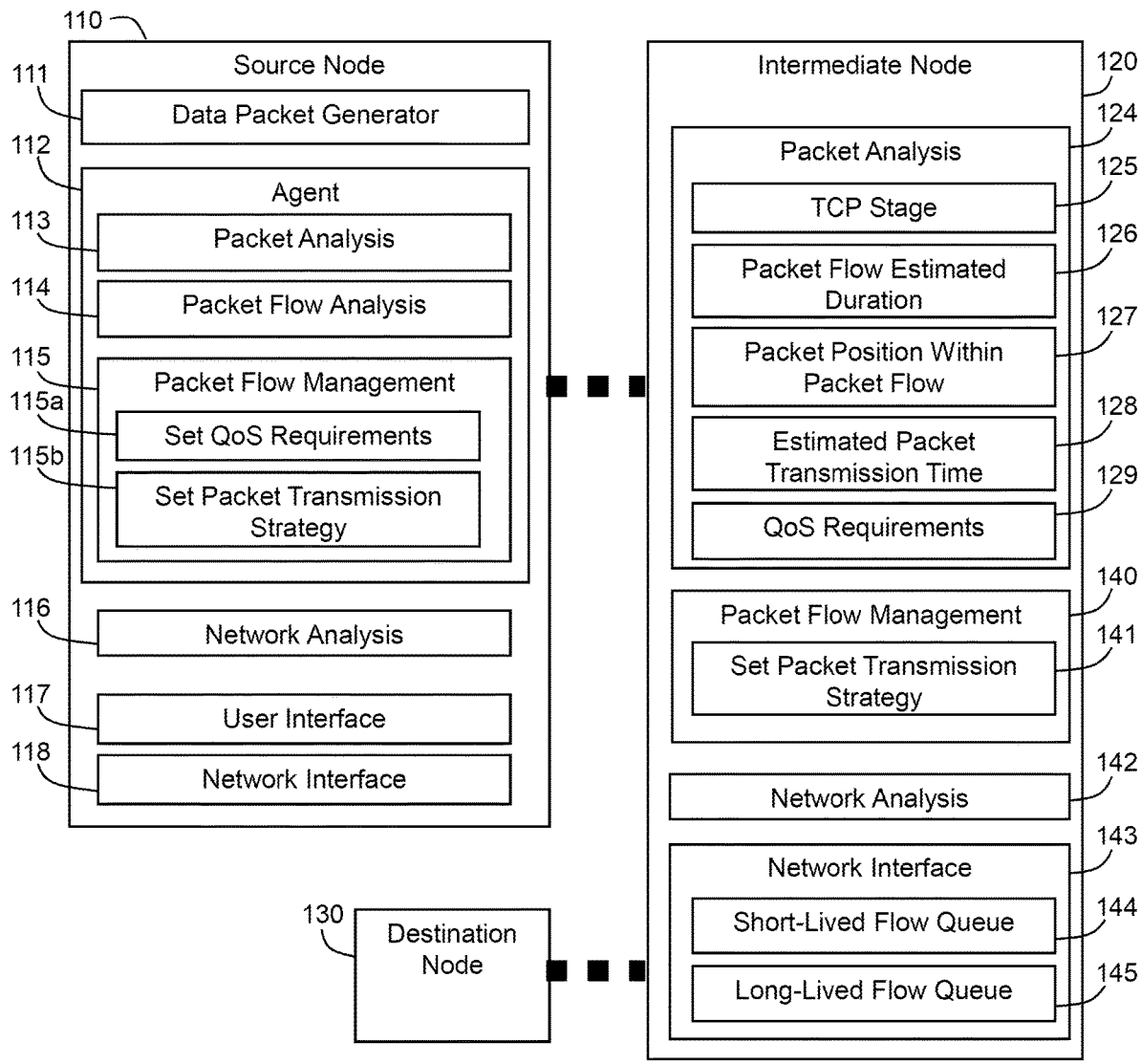

FIGS. 1A and 1B illustrate a system 100 in accordance with one or more embodiments. As illustrated in FIG. 1A, system 100 includes one or more source nodes 110, one or more intermediate nodes 120, and one or more destination nodes 130.

FIG. 1A illustrates three source nodes 110a, 110b, and 110c. A source node 110 is a device, or a client running on a device, which generates a data packet to be transmitted to a destination node 130. FIG. 1A illustrates two destination nodes 130a and 130b. A destination node 130 is a device, or a program running on a device, that receives the data packet from the source node 110. In one or more embodiments, the destination nodes 130 are servers that run applications accessible by users at the source nodes 110. For example, a user device may run a client configured to run one or more applications stored on the destination node 130a or 130b. The source node 110 generates a flow of data including data packets when communicating with the destination nodes 130.

The source nodes 110 communicate with the destination nodes 130 via the intermediate nodes 120. The intermediate nodes 120 include any intervening nodes between the source nodes 110 and the destination nodes. In the example illustrate in FIG. 1A, the intermediate nodes 120 include edge nodes 121a and 121b, core nodes 122a-122d, and a gateway node 123. The edge nodes 121a and 121b, core nodes 122a-122d, and gateway node 123 may be servers in a data network 122, for example. In one embodiment, the edge nodes 121a and 121b include servers, or software running on servers, that provide an interface between a local network and a core network. Similarly, in one embodiment, the gateway node 123 is a server, or software running on a server, that routes traffic from a core network to one or more destination devices.

In one or more embodiments, the data communication paths between the source nodes 110 and the destination nodes 130 may include direct connections, the Internet, or private or commercial communication protocols.

Any intermediate node 120 between any two other nodes may be configured to analyze data packets and to modify transmission strategies associated with the data packets to enable end-to-end acceleration of the data packets through the network. Modifying transmission strategies may include increasing or decreasing an aggressiveness level of data packet acceleration techniques. For example, modifying the transmission strategies may include changing a priority level or altering a transmission path, modifying packet redundancy by duplicating the packet to generate additional copies of the packet for transmission to the destination node, or applying a particular packet acceleration technique, such as forward error correction (FEC), duplication, multipath transmission, interleaving, piggybacking, or per-hop retransmission.

FIG. 1B illustrates a source node 110 and intermediate node 120 in further detail. The source node 110 includes a data packet generator 111. The data packet generator 111 includes applications and circuitry that generate data packets to transmit over a network. The source node 110 includes an agent 112. The agent 112 may include a program or application loaded onto a device to allow the device access to a particular communication protocol.

The agent 112 includes a packet analysis module 113, a data packet flow analysis module 114, and a data packet flow management module 115. The packet analysis module 113 includes circuitry and/or software executed on underlying processing circuitry to analyze packets to identify packet attributes. The data packet flow analysis module 114 includes circuitry and/or software executed on underlying processing circuitry to analyze flow characteristics for a particular packet. For example, the data packet flow analysis module 114 may identify a length of a data packet flow. The data packet flow management module 115 includes logic to set quality-of-service (QoS) requirements 115a based on the identified packet attributes. The data packet flow management module 115 may also include logic to set a packet transmission strategy for a given packet, such as one or more of packet priority, redundancy, and a transmission path, based on a current TCP stage of a data packet flow and one or more additional characteristics of a packet, such as a length of the data packet flow and the QoS requirements. In one embodiment, the source node 110 includes a network analysis module 116 to analyze network characteristics, such as end-to-end latency in the network. The data packet flow management module 115 may set a packet transmission strategy 115b based on the current TCP stage of the data packet flow, the QoS requirements of a packet, and an estimated transmission time to transmit the packets through the network. The data packet flow management module 115 may store the QoS requirements in the data packet by creating a header and attaching the header to the data being transmitted to a destination node 130. In one or more embodiments, the header is a variable size header including protocol information for a particular data transmission protocol, the QoS requirements for the packet, and historical information identifying the packet's experience in the data transmission network.

The data packet flow management module 115 sets a value for a congestion window (CWND) that specifies a number of packets of a data packet flow that may be transmitted from the source node 110 toward the destination node 130 prior to receiving an acknowledgement (ACK) packet from the destination node 130. The data packet flow management module 115 sets the congestion window based on a TCP stage. Each data packet flow begins in a slow-start TCP stage. The congestion window is set to an initial value, such as 10. The source node 110 transmits up to 10 packets of the data packet flow prior to receiving an acknowledgement signal from the destination node 130. If the source node 110 receives the acknowledgement signal prior to completing transmission of the 10 data packets, or within a predetermined period of time after transmitting the 10 data packets, the data packet flow management module 115 increases the size of the congestion window. In one embodiment, the data packet flow management module 115 increases the size of the congestion window exponentially during the slow-start stage of the data packet flow. For example, the data packet flow management module 115 may increase the size of the congestion window from 10 to 20, then to 40, then to 80. Upon increasing the congestion window to a predetermined size, the data packet flow management module 115 may increase the size of the congestion window linearly. For example, in a second TCP stage, the data packet flow management module 115 may increase a size of the congestion window from 160 to 180, then to 200, then to 220, then to 240. Upon increasing the congestion window to a predetermined size, the data packet flow management module 115 may maintain the size of the congestion window constant. For example, in a third TCP stage, the data packet flow management module 115 may maintain the size of the congestion window at 240.

In one or more embodiments, the data packet flow management module 115 sets the size congestion window according to progress from a first TCP stage to a second TCP stage, to the third TCP stage, until a data loss event, such as a failure to receive an acknowledgement signal from a destination node, is detected. Upon detecting the data loss event, the data packet flow management module 115 may reset the congestion window to the initial value of the first TCP stage. The data packet flow management module 115 may restart the process of increasing the size of the congestion window according to the first TCP stage, the second TCP stage, and the third TCP stage.

The source node 110 includes a user interface 117 and a network interface 118. The user interface 117 allows a user to interact with the agent 112. The network interface 118 allows the source node 110 to interact with other devices on the network.

The intermediate node 120 includes a packet analysis module 124, a data packet flow management module 140, a network analysis module 129, and a network interface 143. The packet analysis module 124 includes logic to analyze a packet characteristics and data packet flow characteristics. The packet analysis module 124 includes a TCP stage detection module 125 that identifies a TCP stage associated with a data packet in a data packet flow. For example, the TCP stage module 125 may identify in a data packet a value indicating a current size of a congestion window associated with the data packet flow. The TCP stage module 125 may determine, based on the current size of the congestion window, the current TCP stage associated with a data packet. Alternatively, the TCP stage module 125 may identify the current TCP stage associated with a particular data packet based on TCP stage information in a packet header, or values associated with other packets in a data packet flow.

The packet analysis module 124 analyzes a data packet or data packet flow to identify additional information associated with the data packet and data packet flow. For example, the packet analysis module 124 may include processing logic to identify an estimated duration of a data packet flow 126. The estimated duration may be used to identify the data packet flow as a short-lived data packet flow or a long-lived data packet flow. For example, the packet analysis module 124 may determine that a particular data packet flow is a short-lived flow based on determining that the particular data packet flow is estimated to terminate prior to the TCP stage changing from a slow-start stage to a congestion avoidance stage. Conversely, the packet analysis module 124 may determine that the particular data packet flow is a long-lived flow based on determining that the particular data packet flow is estimated to terminate after the TCP stage for the particular data packet flow has entered the congestion-avoidance TCP stage.

The packet analysis module 124 may determine a position of a particular data packet within a data packet flow 127. For example, the packet analysis module 124 may identify a FIN flag as being set, indicating that the particular data packet is the last data packet in a particular data packet flow. Alternatively, the packet analysis module 124 may determine that a particular data packet is within a predetermined distance of the last data packet in a data packet flow, based on an estimated length of the data packet flow.

In one or more embodiments, the packet analysis module 124 estimates a length of a data packet flow based on criteria including: a source of the data packet flow, a destination of the data packet flow, a type of data being transmitted in the data packet, header information identifying a number of packets in a data packet flow, and a machine-learning-model generated estimate of a data packet flow length for the particular data packet flow.

The packet analysis module 124 may estimate a packet transmission time 128 for a particular packet. The packet analysis module 124 may further identify the quality of service (QoS) requirements 129 for the particular data packet. The estimated packet transmission time 128 may include historical information regarding the experience the packet has had so far along the data transmission network. For example, when the intermediate node 120 analyzes the estimated packet transmission time between the source node 110 and the intermediate node 120, the intermediate node 120 may update a value in a "history" field of a header of the data packet to identify a level of delay experience so far by the data packet. The data packet flow management module 140 includes logic to select a data packet transmission strategy 141 for a received data packet. For example, the data packet flow management module may set one or more of packet priority, redundancy, and a transmission path based on the TCP stage of a data packet flow associated with a particular packet and one or more additional packet characteristics.

In one or more embodiments, the network interface 143 includes a short-lived flow queue 144 and a long-lived flow queue 145. Based on determining that a particular data packet is part of a short-lived data packet flow, the intermediate node 120 stores the particular data packet in the short-lived flow queue 144 for transmission to a next node in the data communication network. Based on determining that a particular data packet is part of a long-lived data packet flow, the intermediate node 120 stores the particular data packet in the long-lived flow queue 145 for transmission to a next node in the data communication network.

In one embodiment, the packet transmission strategy includes a transmission fairness strategy for determining how to transmit the packets from the short-lived flow queue 144 relative to the packets from the long-lived flow queue 145. For example, packets in the short-lived flow queue 141 may have higher priority levels than packets in the long-lived flow queue 145. As a result, the packets in the short-lived flow queue 144 may be given transmission priority over the packets in the long-lived flow queue 145. This may result in delays in transmitting the packets in the long-lived flow queue 145. Accordingly, a transmission fairness strategy may include a protocol to interleave transmitting packets from the long-lived flow queue 145 among the transmission of the packets in the short-lived flow queue 144. The interleaving of packets may be based on: a number of packets transmitted from the queues 144 and 145, a queue time of packets in the queues 144 and 145, a number of data packets stored in the queues 144 and 145. For example, the transmission fairness strategy may require alternating transmitting equal numbers of packets from the short-lived flow queue 144 and the long-lived flow queue 145. Alternatively, or in addition, the transmission fairness strategy may require transmitting packets from the long-lived flow queue 145 if they have been stored in the long-lived flow queue 145: (a) longer than any packets stored in the short-lived flow queue 144, and (b) for a duration of time that meets or exceeds a threshold duration of time.

Additional embodiments and/or examples relating to computer networks are described below in Section 6, titled "Computer Networks and Cloud Networks."

In one or more embodiments, the data transmission system 100 refers to hardware and/or software configured to perform operations described herein for analyzing and transmitting data through a data network. Examples of operations for analyzing data, modifying transmission characteristics of data packets, and transmitting the data in a network are described below with reference to FIG. 2.

In an embodiment, the data transmission system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, user interface 117 refers to hardware and/or software configured to facilitate communications between a user and the data transmission system 100. The user interface 117 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of user interface 117 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, user interface 117 is specified in one or more other languages, such as Java, C, or C++.

Figure 2:
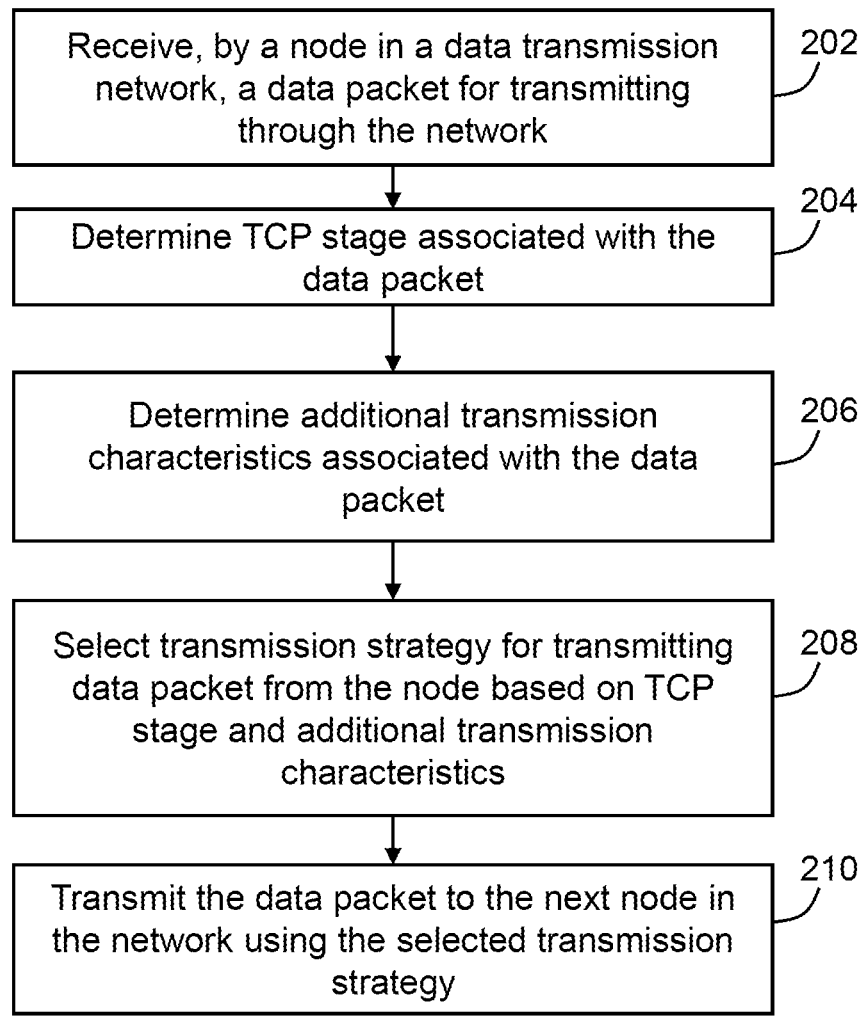
FIG. 2 illustrates an example set of operations for changing transmission strategy of data packets in accordance with one or more embodiments.

3. Modification of Packet Transmission Characteristics by an Intermediate Node FIG. 2 illustrates an example set of operations for analyzing a network and modifying packet transmission strategies in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A node in a data transmission system receives a data packet (Operation 202). In one embodiment, the node is a source node at which the data packet is generated. In an alternative embodiment, the node is an intermediate node between the source node and a destination node. The data packet is one data packet among a flow of data packets transmitting data between nodes in the network. The data packets include one or more headers for managing and directing the flow of data in the network. The headers may correspond to different data transmission protocols or different networks through which the data is to be transmitted. In one embodiment, the data packet includes information for transmission according to a Transmission Control Protocol (TCP) data transmission protocol. The data packets also include a body including the data being transmitted to a destination for use by processes or applications running at the destination.

The node determines a TCP stage of a data packet flow to which the data packet belongs (Operation 204). For example, the node may analyze stage information, such as a congestion window (CWND) value, in the data packet to determine the current TCP stage associated with the data packet. According to one example, the node determines whether the packet is associated with a slow-start TCP stage or a congestion-avoidance TCP stage. In addition, one or both of the slow-start stage and the congestion-avoidance stage may include one or more sub-stages. For example, a system may implement a slow-start stage having an initial sub-stage in which a CWND value is increased logarithmically and a subsequent sub-stage in which the CWND value is increased linearly. The node may determine whether the packet is associated with the initial sub-stage of the slow-start stage or the subsequent sub-stage of the slow-start stage. The congestion-avoidance TCP stage may be characterized by a constant value CWND. The system may reset the TCP stage to an initial value of the slow-start TCP stage based on detecting, during any TCP stage, a packet-loss event, such as a failure to receive an acknowledgement signal (ACK) within a predefined period of time.

The node determines additional transmission characteristics associated with the data packet (Operation 206). Examples of additional transmission characteristics include: a position of the data packet within a data packet flow, a duration, or estimated duration, of the data packet flow, an estimated transmission time for the data packet from the source node to the destination node, and a quality-of-service (QoS) requirement associated with the data packet.

In one embodiment, the QoS requirement is represented by a value selected from among two or more values that each correspond to a different treatment of the data packet as the data packet is transmitted through the data network from a source node to a destination node. In one embodiment, the QoS requirement is represented as a priority index value having a predetermined range. A value at one end of the range corresponds to a first set of transmission characteristics and a value at an opposite end of the range corresponds to another set of transmission characteristics. The values between the ends of the range correspond to varying transmission characteristics between the first set and the second set.

For example, the QoS requirement may correspond to a Wi-Fi Multimedia (WMM) protocol having as different QoS levels: background, best effort, video, and voice. In this example, a data packet having a QoS of "background" is transmitted at a lower priority than a data packet having a QoS of "best effort."

In another example, the QoS requirement may correspond to a differentiated services (DiffServ) protocol. In a DiffServ protocol, packets entering the network are classified according to the type of data being transmitted. Each node, or hop, in the network handles the packet according to the classification. The classification is stored in a header of the data packet. Example classifications include: default forwarding, expedited forwarding, and assured forwarding. Each classification may further include one or more levels of priority. Default forwarding may correspond to a best effort level of handling, in which data packets are forwarded along the network according to network conditions and availability. Expedited forwarding may provide a higher level of priority as the packet is being forwarded to provide low-loss and or low-latency to the data packets. Assured forwarding provides a higher level of priority, ensuring that predetermined data quality conditions are met as the packets are being forwarded along the network.

As packets are transmitted through the network, the packets having higher priority given greater or faster access to resources. For example, a packet having a higher priority may be transmitted redundantly to reduce packet loss, or may be transmitted ahead of packets having lower priority, reducing delay. While WMM and DiffServ are two protocols that are described by way of example, embodiments of the invention encompass any system that stores a priority value in a packet header to assign different priority levels to data packets based on predetermined criteria.

In an embodiment, the node determines the position of the data packet within a data packet flow by analyzing information included in a packet header. For example, the packet header may include a flag indicating whether the packet is the last packet in a data packet flow. According to another example, the packet header may include a packet count of the number of packets in the data packet flow.

In another embodiment, the node determines the position of the data packet within the data packet flow based on data extrinsic to a packet header. For example, the node may determine that a majority of data packet flows transmitting the type of data being transmitted by the particular data packet flow have a fixed length, or a length within a predefined range. Accordingly, the node may estimate the length of the present data packet flow based on similar data packet flows. The node may estimate a position of the present data packet within the present data packet flow based on the estimated length of the present data packet flow. Additional examples of data extrinsic to packet header information include: typical lengths of data packet flows from a particular source node, typical lengths of data packet flows directed to a particular destination node, and typical lengths of data packet flows originating from a particular application.

In one or more embodiments, the node determines whether a particular data packet flow is short-lived or long-lived based on (1) the determined or estimated length of the data packet flow, and (2) known lengths of TCP stages. According to one example, the node determines a particular data packet flow is a short-lived flow based on determining that the length of the data packet flow is less than a number of packets that may be transmitted prior to transitioning from a slow-start TCP stage to a congestion-avoidance TCP stage. For example, the node may determine that a total of 1600 packets may be transmitted in a slow-start TCP stage prior to transitioning to the congestion-avoidance TCP stage. The node may further estimate that a data packet flow associated with a particular data packet has a length of 800 data packets. The node may determine, based on the length of the data packet flow being less than the total number of packets transmitted during the slow-start TCP stage, that the data packet flow is a short-lived flow.

While an example is provided above in which a data packet flow is determined to be short-lived based on having a length less than a number of data packets that maybe transmitted in a slow-start TCP stage, the node may identify the data packet flow as being short-lived based on alternative criteria, such as determining the data packet flow has a length that would exceed a number of packets that may be transmitted in a slow-start TCP stage by less than a predetermined threshold. For example, the node may determine that if the length of the data packet flow would correspond to transmitting fewer than 800 packets in a congestion-avoidance TCP stage, the data packet flow is "short-lived." According to another example in which the slow-start TCP stage includes an exponential-growth sub-stage for a CWND size and a linear-growth sub-stage for the CWND size, the node may determine that the data packet flow is a short-lived data packet flow based on determining that the length of the data packet flow is less than a number of packets corresponding to transitioning from the exponential-growth sub-stage to the linear-growth sub-stage.

The node selects a data packet transmission strategy for transmitting a particular data packet based on the TCP stage of the data packet flow to which the data packet belongs (Operation 208). The node may select the data packet transmission strategy further based on one or more additional characteristics of the data packet. For example, the node may select the data packet transmission strategy based on the TCP stage associated with the data packet in addition to one or more of: an estimated length of a data packet flow associated with the data packet, a position of the data packet in the data packet flow, an estimated packet transmission time from the source node to a destination node, and QoS requirements of the data packet.

For example, the node may select a data packet transmission strategy for a particular data packet by altering a priority value in a priority field of a header of the particular data packet. Altering the priority value would result in subsequent nodes handling the data packet differently—such as transmitting the data packet before lower-priority data packets.

Selecting the data packet transmission strategy may also include altering a redundancy of a data packet. The node generates one or more duplicates of the data packet to reduce loss, for example. In addition, or in the alternative, a node may alter a value in a field "redundancy" in the header of the packet to indicate to one or more subsequent nodes along the data transmission network to expect a redundant data packet or to generate a redundant data packet.

In one or more embodiments, the system alters a redundancy of a data packet based on the network characteristics by supplementing 1 packet in N packets with M levels of redundancy. For example, the system may generate two duplicate data packets for every 5th data packet in a data packet flow. In addition, or in the alternative, the system may apply statistical or machine learning formulae based on network conditions to determine a redundancy. For example, the system may generate one duplicate data packet for every 4th packet for a first period of time. Then, the system may switch to generating three duplicate copies of every $3^{rd}$ data packet for a second period of time if the data packet has a size less than a threshold size. In addition, altering the redundancy of the data packet includes altering a spacing between transmitting duplicate data packets. For example, the system may transmit one data packet, then wait a predetermined period of time before transmitting a duplicate data packet to increase a probability of receiving at least one of the duplicate data packets.

Selecting the data packet transmission strategy may also include altering a transmission path of the data packet. For example, in a network in which an intermediate node is connected to a destination node via multiple different data transmission paths, the intermediate path may alter the data transmission path to which the data packet is directed based on the determining that one transmission path has a lower packet loss rate than another transmission path. The different data transmission paths may have different transmission media—such as wireless transmission, wired transmission, fiber optic transmission, or cellular transmission—or may be routed through different intermediate nodes. In addition, or in the alternative, the intermediate node may alter a value in a field "transmission path" in the header of the packet to indicate to one or more subsequent nodes along the data transmission network to direct the data packet to a particular transmission path. For example, if a data transmission network includes two different types of data transmission paths, and one is typically faster than the other, the intermediate node may direct the data transmission packet to the faster data transmission path based on determining that the estimated transmission time using the slower data transmission path would not satisfy the QoS requirement of the data packet.

Selecting the data packet transmission strategy may also include combining two or more packets prior to transmitting the packets to the next node. The two or more packets may originate from a same source node or from different source nodes. For example, if a node determines that two data packets from two separate source nodes are destined for the same destination node, the node may combine the data packets.

In one or more embodiments, a node may select the data packet transmission strategy based on the type of data transmission segment being traversed. If the next segment along the data transmission path is a wireless data transmission segment, a node may modify a priority level of the data packet. If the next segment along the data transmission path is a transmission control protocol (TCP) segment, the node may combine multiple packets together to reduce the total number of separate packets being transmitted. The node identifies the type of transmission media in one or more subsequent segments of the data transmission path and selects or modifies different packet transmission characteristics based on the different transmission media.

Selecting a data packet transmission strategy may also include applying different data packet acceleration techniques based on a distance between two nodes. For example, a node may analyze an estimated transmission time between the node and the next node in the data transmission network. If the estimated transmission time is less than a predetermined threshold, the node may apply reactive data packet acceleration techniques to transmit the data packet. Reactive techniques include re-transmission of data packets and jitter-smoothing by buffering data packets. If the estimated transmission time is greater than, or equal to, the predetermined threshold, the node may apply a different set of techniques, such as proactive techniques to transmit the data packet. Proactive techniques include duplication of data packets, piggybacking of one data packet onto another (or combining data packets), transmitting data packets along more than one data path towards a destination node, and forward error correction (FEC). In one or more embodiments, the predetermined threshold is selected based on application performance at the destination node. For example, the threshold may be selected to be in a range from 5 milliseconds to 20 milliseconds. At such a range, performing reactive techniques as the modification of transmission characteristics may not be noticeable by the destination node. In contrast, if a transmission time between two nodes is greater than 20 milliseconds, performing reactive techniques may cause a data transmission delay that is noticeable by a destination application. In one embodiment, the intermediate node applies (a) only reactive techniques if the estimated transmission time between two nodes is 5 milliseconds or less, (b) a combination of reactive and proactive techniques if the estimated transmission time between two nodes is between 5 milliseconds and 20 milliseconds, and (c) only proactive techniques if the estimated transmission time between the two nodes is 20 milliseconds or more. While the values of 5 milliseconds and 20 milliseconds are provided by way of example, any values may be selected according to network characteristics and the applications or processes being performed at the destination node.

In one or more embodiments, the node selects the data packet transmission strategy from among a set of transmission strategies that range from a least-aggressive data packet transmission strategy to a most-aggressive data packet transmission strategy. A more aggressive data packet transmission strategy employs a higher ratio than a less aggressive data packet transmission strategy of proactive to reactive data packet acceleration techniques. Proactive data packet acceleration techniques utilize network resources to prevent data transmission failures. Reactive data packet acceleration techniques respond to detected data packet transmission failures after they occur to correct the failures. Proactive techniques include duplication of data packets, piggybacking of one data packet onto another (or combining data packets), transmitting data packets along more than one data path towards a destination node, and forward error correction (FEC). Reactive techniques include re-transmission of data packets and jitter-smoothing by buffering data packets.

For example, a least-aggressive data packet transmission strategy may include one or more reactive data packet acceleration techniques and no proactive transmission data packet acceleration techniques. A most-aggressive data packet transmission strategy may include one or more proactive data packet acceleration techniques. The most-aggressive data packet transmission strategy may also include one or more reactive data packet acceleration techniques. The most-aggressive transmission strategy may include proactive and reactive data packet acceleration techniques that consume more computing resources than alternative data packet acceleration techniques. In contrast, the least-aggressive data packet transmission strategy may employ reactive data packet acceleration techniques, without employing proactive data packet acceleration techniques. The node may select a data packet transmission strategy from among a set of strategies ranging from the least-aggressive data packet transmission strategy that employs exclusively reactive data packet acceleration techniques to the most-aggressive data packet transmission strategy that employs one or more proactive data packet acceleration techniques and one or more reactive data packet acceleration techniques.

Upon modifying the data packet transmission strategy of the data packet (Operation 210), the node transmits the data packet to the next node along the data transmission path toward the destination node (Operation 210).

4. Example Embodiment of Implementing a Fairness Strategy for Transmitting Data Packets According to one embodiment, a node in a data transmission network transmits data packets to the next node in the network according to a data packet transmission fairness strategy. The fairness strategy governs how the node selects between transmitting a data packet belonging to a short-lived data packet flow and a data packet belonging to a long-lived data packet flow.

As illustrated in FIG. 2, a node in a data communications network identifies a TCP stage of data flows associated with received data packets. The node may further determine, based on the TCP stage, whether received packets belong to short-lived data packet flows or long-lived data packet flows. According to an example, embodiment, short-lived data packet flows are defined by a length of the data packet flow relative to a length of a slow-start TCP stage. For example, a short-lived data packet flow may be defined as having a length, measured by a number of data packets in the data packet flow, less than a number of packets that are transmitted prior to transitioning from a slow-start TCP stage to a congestion-avoidance TCP stage.

The node stores data packets belonging to a short-lived data packet flow in a short-lived data packet queue. The node stores data packets belonging to a long-lived data packet flow in a long-lived data packet queue. The node determines whether to transmit a data packet from the short-lived data packet queue or from the long-lived data packet queue according to a data packet transmission fairness strategy.

In one or more embodiments, packets in the short-lived flow queue have higher priority levels than packets in the long-lived flow queue. Accordingly, bases solely on priority levels, the node would continually transmit the packets in the short-lived flow queue prior to the packets in the long-lived flow queue. This may result in delays in transmitting the packets in the long-lived flow queue.

In one or more embodiments, the node implements a data packet transmission fairness strategy to govern how the node interleaves transmitting packets from the long-lived flow queue among the transmission of the packets in the short-lived flow queue.

According to one example embodiment, the node implements the fairness strategy by tracking a total delay time that packets are stored in the long-lived data packet queue and the short-lived data packet queue. The node inserts a data packet from the long-lived data packet queue among data packets of the short-lived data packet queue based on determining that the delay time for one or more packets in the long-lived data packet queue exceeds the delay time of all the data packets in the short-lived data packet queue.

According to another example embodiment, the node implements the transmission fairness strategy by transmitting packets from the long-lived flow queue if they have been stored in the long-lived flow queue: (a) longer than any packets stored in the short-lived flow queue, and (b) for a duration of time that meets or exceeds a threshold duration of time.

According to yet another example embodiment, the node implements the transmission fairness strategy by interleaving data packets from the long-lived data packet queue among data packets from the short-lived data packet queue when a size of the long-lived data packet queue relative to the short-lived data packet queue exceeds a threshold. For example, the node may interleave data packets from the long-lived data packet queue among the data packets of the short-lived data packet queue based on determining that the long-lived data packet queue stores 150% the number of packets as the short-lived data packet queue.

5. Example Embodiment of Selecting Data Packet Acceleration Techniques by a Source Node in a Network According to one or more embodiments, a source node selects one or more data packet acceleration techniques for transmitting a data packet through a data communications network based on a TCP stage of a data packet flow to which the data packet belongs.

Referring to FIG. 2, a source node may receive a data packet based on the data packet being generated by a process executing on the source node (Operation 202).

The source node determines a TCP stage of a data packet flow to which the data packet belongs (Operation 204). The source node may determine the TCP stage associated with the data packet based on data included in the data packet. In addition, or in the alternative, the source node maintains a record of the current TCP stage of each data packet flow generated by the source node. Based on receiving acknowledgement messages from a destination node indicating that data packets transmitted by the source node have been received by the destination node, the source node updates the TCP stage of the data packet flow.

The source node selects one or more data packet acceleration techniques for transmitting the data packet through the data communication network based on the TCP stage of the data packet flow to which the data packet belongs. The data packet acceleration techniques may correspond to transmission strategies. For example, one set of data packet acceleration techniques defines a first transmission strategy. Another set of data packet acceleration techniques defines a second transmission strategy.

6. Example Embodiment of Selecting a Data Packet Transmission Strategy

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3:
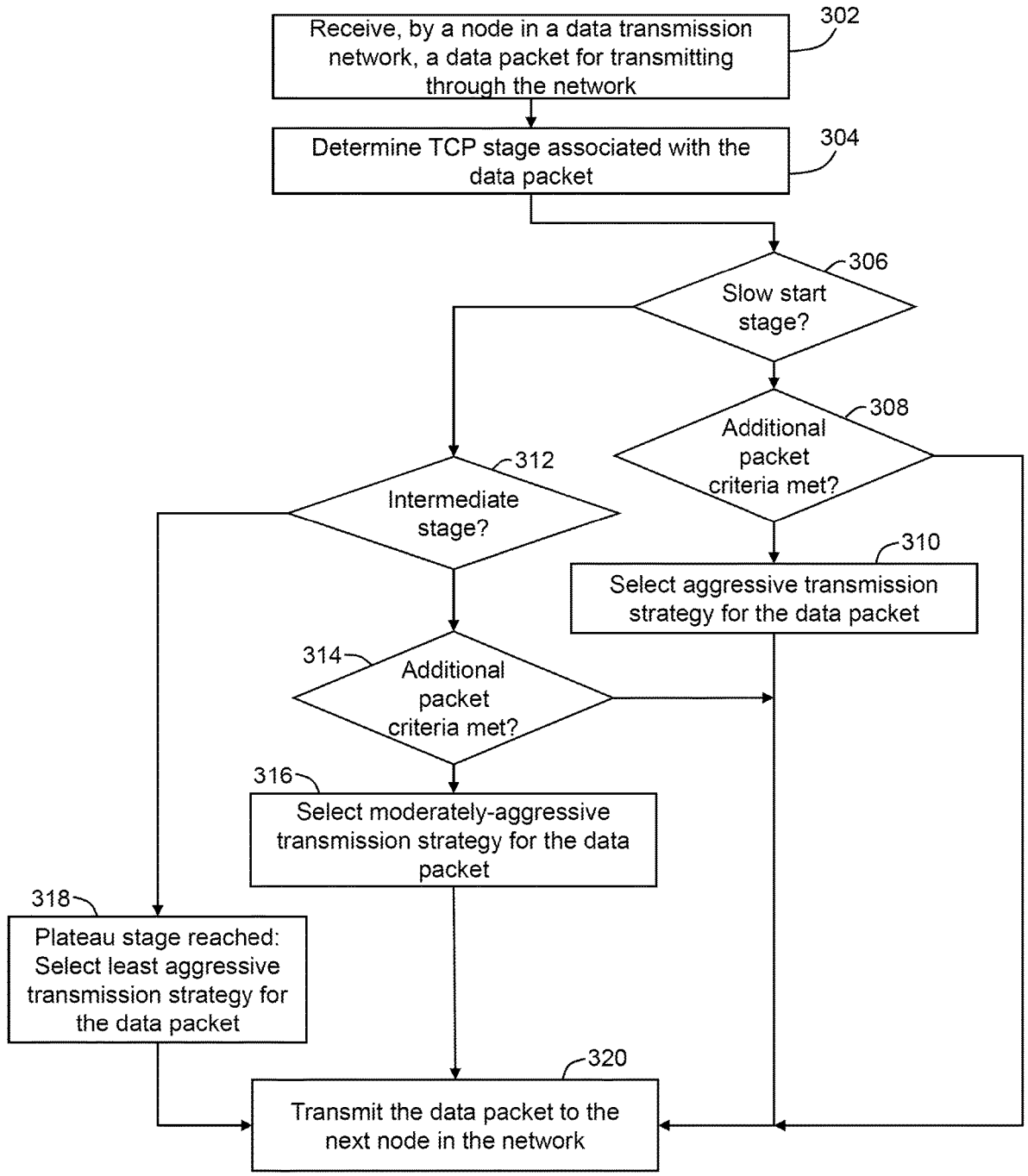
FIG. 3 illustrates an example of a set of operations for changing transmission strategy of data packets based on a TCP stage in accordance with one or more embodiments.

FIG. 3 illustrates an example set of operations for selecting a data packet transmissions strategy. In the example embodiment described in FIG. 3, the operations are implemented by an intermediate node in a data communications network, between a source node and a destination node. In an alternative embodiment, the set of operations described in FIG. 3 may be implemented by a source node.

An intermediate node in a data transmission system receives a data packet (Operation 302). The intermediate node may receive the data packet from a source node or from another intermediate node. The data packet is one data packet among a flow of data packets carrying data between nodes in the network. The data packet includes information for transmission according to a Transmission Control Protocol (TCP) data transmission protocol. The data packet also includes a body including the data being transmitted to a destination node for use by processes or applications running at the destination node.

The intermediate node determines a TCP stage of a data flow to which the data packet belongs (Operation 304). For example, the node may analyze stage information, such as a congestion window (CWND) value, in the data packet to determine the current TCP stage associated with the data packet. The intermediate node determines whether the TCP stage is a slow-start stage, an intermediate stage, or a plateau. The slow-start stage is characterized by an exponential increase in a size of the congestion window. For example, upon repeatedly successfully receiving an acknowledgement message from a destination node within a predefined period of time, a source node may increase a size of the congestion window from 10, to 20, to 40, to 80, to 160. The first packet of the data packet flow and n subsequent packets of the data packet flow are transmitted in the slow-start TCP stage. The intermediate TCP stage is characterized by a linear increase in a size of the congestion window. For example, upon repeatedly successfully receiving an acknowledgement message from a destination node within a predefined period of time, a source node may increase a size of the congestion window from 160, to 180, to 200, to 220, to 240, and repeatedly up to 320. The n+1 packet of the data packet flow and k subsequent packets of the data packet flow are transmitted in the intermediate TCP stage. The plateau TCP stage is characterized by a constant size of the congestion window. For example, upon repeatedly successfully receiving an acknowledgement message from a destination node within a predefined period of time, a source node may maintain a size of the congestion window at 320. Upon failing to receive an acknowledgement ACK message from a destination node within a predefined period of time during any of the TCP stages, the source node may reset the congestion window to an initial value (e.g., 10) and the TCP stage to the slow-start stage.

If the intermediate node determines that the received data packet is being transmitted in a slow-start TCP stage (Operation 306), and that additional packet criteria are met (Operation 308), the intermediate node selects an aggressive data packet transmission strategy for the received data packet (Operation 310). For example, the intermediate node may determine that the received packet is being transmitted in the slow-start TCP stage and the received data packet also is part of a short-lived data packet flow. As another example, the intermediate node may determine that the received packet is being transmitted in the slow-start TCP stage and the received data packet also is a last data packet in a data packet flow. As yet another example, the intermediate node may determine that the received packet is being transmitted in the slow-start TCP stage and the received data packet also has a high priority value or a high QoS requirement value.

Selecting the aggressive data packet transmission strategy may include selecting one or more proactive data packet acceleration techniques. For example, the intermediate node may duplicate the data packet and transmit the data packet and the duplicate data packet to a next node along a transmission path. As another example, the intermediate node may alter a transmission path for the received data packet or transmit a duplicate data packet via a parallel transmission path.

If the intermediate node determines that the received data packet is being transmitted in an intermediate TCP stage (Operation 312), and that additional packet criteria are met (Operation 314), the intermediate node selects a moderately-aggressive data packet transmission strategy for the received data packet (Operation 316). The moderately-aggressive data packet transmission strategy is less aggressive than the aggressive transmission strategy selected in Operation 310. For example, the intermediate node may determine that the received packet is being transmitted in the intermediate TCP stage and the received data packet also is part of a short-lived data packet flow. As another example, the intermediate node may determine that the received packet is being transmitted in the intermediate TCP stage and the received data packet also has a high priority value or a high QoS requirement value.

Selecting the moderately-aggressive data packet transmission strategy may include selecting one or more proactive data packet acceleration techniques. The moderately-aggressive data packet transmission strategy may differ from the aggressive data packet transmission strategy in a number of proactive data packet acceleration techniques utilized and a resource-intensiveness of the selected data packet acceleration techniques. For example, an aggressive data packet transmission strategy may implement two proactive data packet acceleration techniques and two reactive data packet acceleration techniques. A moderately-aggressive data packet transmission strategy may implement one proactive data packet acceleration technique and two reactive data packet acceleration techniques.

If the intermediate node determines that the received data packet is being transmitted in a plateau TCP stage (Operation 318), the intermediate node selects a least-aggressive data packet transmission strategy for the received data packet (Operation 316). The least aggressive data packet transmission strategy is less aggressive than the moderately-aggressive transmission strategy selected in Operation 316. Selecting the least-aggressive data packet transmission strategy may include selecting one or more reactive data packet acceleration techniques, without selecting any proactive data packet acceleration techniques.

Upon selecting the data packet transmission strategy for the received data packet, the intermediate node transmits the data packet to the next node along the data transmission path toward the destination node using the particular data packet acceleration techniques associated with the selected data packet transmission strategy (Operation 320).

7. Example Embodiment of Data Packet

A detailed example is described below for purposes of clarity. Components and/or operations described below should be understood as one specific example which may not be applicable to certain embodiments. Accordingly, components and/or operations described below should not be construed as limiting the scope of any of the claims.

Figure 4:
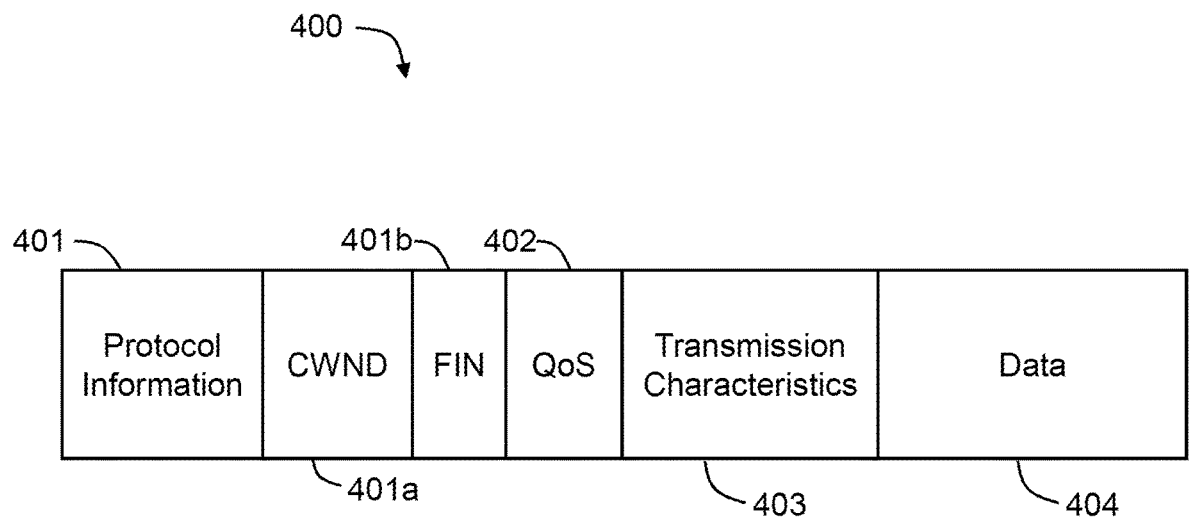
FIG. 4 illustrates an example of a data packet in accordance with one or more embodiments.

FIG. 4 illustrates a data packet 400 according to an example embodiment. The data packet 400 includes protocol information 401 corresponding to a network through with the data packet 400 is to be transmitted. When the data packet 400 is transmitted through multiple networks, such as a local wireless network connected to a core data network, the data packet may include multiple protocol fields 401 corresponding to the multiple different protocols of the different networks.

The protocol information 401 may include Transmission Control Protocol (TCP) data transmission protocol information. For example, the protocol information 401 may include a congestion window field 401a indicating a current size of a congestion window (CWND) corresponding to a current TCP stage associated with the data packet 400. The protocol information 401 may also include FIN flag 401b indicating whether the data packet 400 is a last data packet in a data packet flow.

The data packet 400 includes a QoS field 402. The QoS field defines a quality of service that the data packet 400 requires during transmission from a source node to a destination node in a network. The QoS field 402 may include different values for packet transmission requirements such as a required transmission time of the packet, an acceptable level of jitter experienced by the packet, and an acceptable level of loss experienced by the packet. While these packet transmission characteristics are provided by way of example, embodiments encompass any types of packet transmission requirements affecting the QoS of a data packet flow. In one or more embodiments, the QoS field 402 is a single priority index value. The priority index value may be mapped to different network conditions. For example, a priority index value of "1" may be mapped to values of 100, 11, and 1 for transmission time, jitter, and loss, respectively. The values for transmission time, jitter, and loss correspond to values such as a transmission time in milliseconds, jitter in milliseconds, and packet loss measured in percentage. A priority index value of "2" may be mapped to values of 100, 18, and 3 for transmission time, jitter, and loss, respectively. A priority index value of "3" may be mapped to values of 160, 11, and 3 for transmission time, jitter, and loss, respectively. A priority index value of "4" may be mapped to values of 160, 20, and 6 for transmission time, jitter, and loss, respectively. In other words, different priority index values may be mapped to different packet transmission requirements. In addition, a priority index value at one end of the index generally corresponds to stricter QoS requirements than a priority index value at an opposite end of the index.

The data packet 400 includes a field to set transmission characteristics associated with data packet acceleration techniques 403 for the data packet 400. Examples of transmission characteristics include values to represent: (a) a priority level for the packet, (b) a redundancy value indicating whether a redundant copy of the packet has been generated, or should be generated by a subsequent node, and (c) a transmission path value indicating whether the packet should be directed along a particular transmission path through the network. While these are provided by way of example, embodiments encompass any data packet transmission characteristics that indicate how the data packet has been handled, or how the packet should be handled, in the network.

The data packet 400 also includes data 404 that is destined for the destination node, to be used by the destination node in one or more processes or applications. In one or more embodiments, the data packet 400 includes a field (401, 404, or another field) indicating a type of the data 404, such as video data, voice data, text-messaging-type data, application data, etc.

8. Training a Machine Learning Model

In one or more embodiments, a system trains a machine learning model to recommend or implement data packet transmission strategies in nodes of a communications network. For example, the system may observe characteristics of the data communications network over a period of time. The system may train a machine learning model based on the observed characteristics of the network and of data packets transmitted through the network. The system may store implementations of the machine learning model in one or more nodes throughout the communications network. Upon receiving a particular data packet, the nodes may collect information associated with the particular data packet and a data packet flow associated with the particular data packet. The nodes may apply the machine learning model to the set of information associated with the particular data packet to select a data packet transmission strategy for the particular data packet. The node may implement data packet acceleration techniques associated with the selected data packet transmission strategy to transmit the data packet to a next node in the data communications network.

Figure 5:
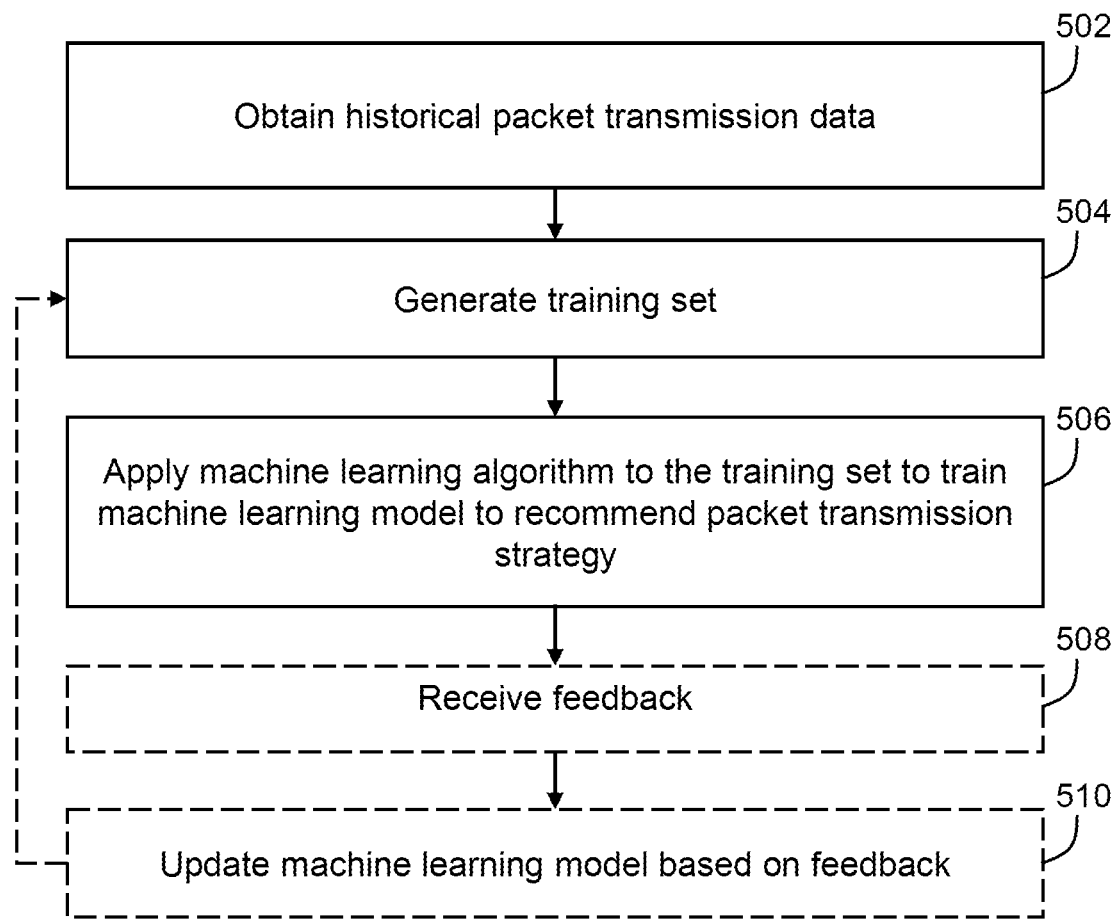
FIG. 5 illustrates an example of a set of operations for training a machine learning model to recommend a data packet transmission strategy in accordance with one or more embodiments.

FIG. 5 illustrates an example set of operations for training a machine learning model to recommend a data packet transmission strategy, in accordance with one or more embodiments. One or more operations illustrated in FIG. 5 may be modified, rearranged, or omitted all together. Accordingly, the particular sequence of operations illustrated in FIG. 5 should not be construed as limiting the scope of one or more embodiments.

FIG. 5 illustrates an example of a set of operations for training a machine learning model, such as a neural network or support vector machine (SVM), according to one or more embodiments.

A system obtains a set of historical data including packet transmission data (Operation 502). The packet transmission data may include: (a) information associated with transmission times, delay, and jitter associated with different transmission paths in a data transmission network, (b) information associated with lengths of data packet flows transmitted from/to nodes in the data transmission network, (c) information associated with lengths of data packet flows transmitting particular types of data through the data transmission network, (d) TCP stages of data flows, and (e) data packet acceleration techniques applied to data packets in the network.

The system generates a training data set from the set of historical data (Operation 504). The training data set includes a subset of the historical data packet transmission data. The training data set may further include data packet acceleration techniques applied to the historical data packets. For example, one data point in the set of training data includes a set historical packet transmission data indicating a first set of data packet acceleration techniques was applied to a first data packet having first data packet characteristics. Another data point in the set of training data includes data indicating a second set pf data packet acceleration techniques was applied to a second data packet having second data packet characteristics.

The system applies a machine learning algorithm to the training data set to train the machine learning model to learn relationships or correlations between particular sets of data packet characteristics and respective sets of data packet acceleration techniques (Operation 406). The machine learning model generates a recommendation for a set of data packet acceleration techniques based on associated data packet characteristics.

In one embodiment, training the machine learning model includes receiving feedback for a set of data packet acceleration techniques recommended by the machine learning model (Operation 408). For example, the system may display a recommendation for a set of data packet acceleration techniques generated by the machine learning model on a GUI. The system may receive one or more inputs to alter the set of data packet acceleration techniques. For example, the system may recommend for a particular set of data packet characteristics applying a first proactive data packet acceleration technique and a second reactive data packet acceleration technique. A user may provide feedback to omit the first proactive data packet acceleration technique for the given set of data packet characteristics.

The system updates the machine learning model based on the feedback (Operation 510).

9. Example Embodiment of Modification of Packet Transmission Strategy by an Intermediate Node A detailed example is described below for purposes of clarity. Components and/or operations described below should be understood as one specific example which may not be applicable to certain embodiments. Accordingly, components and/or operations described below should not be construed as limiting the scope of any of the claims.

Figure 6A:
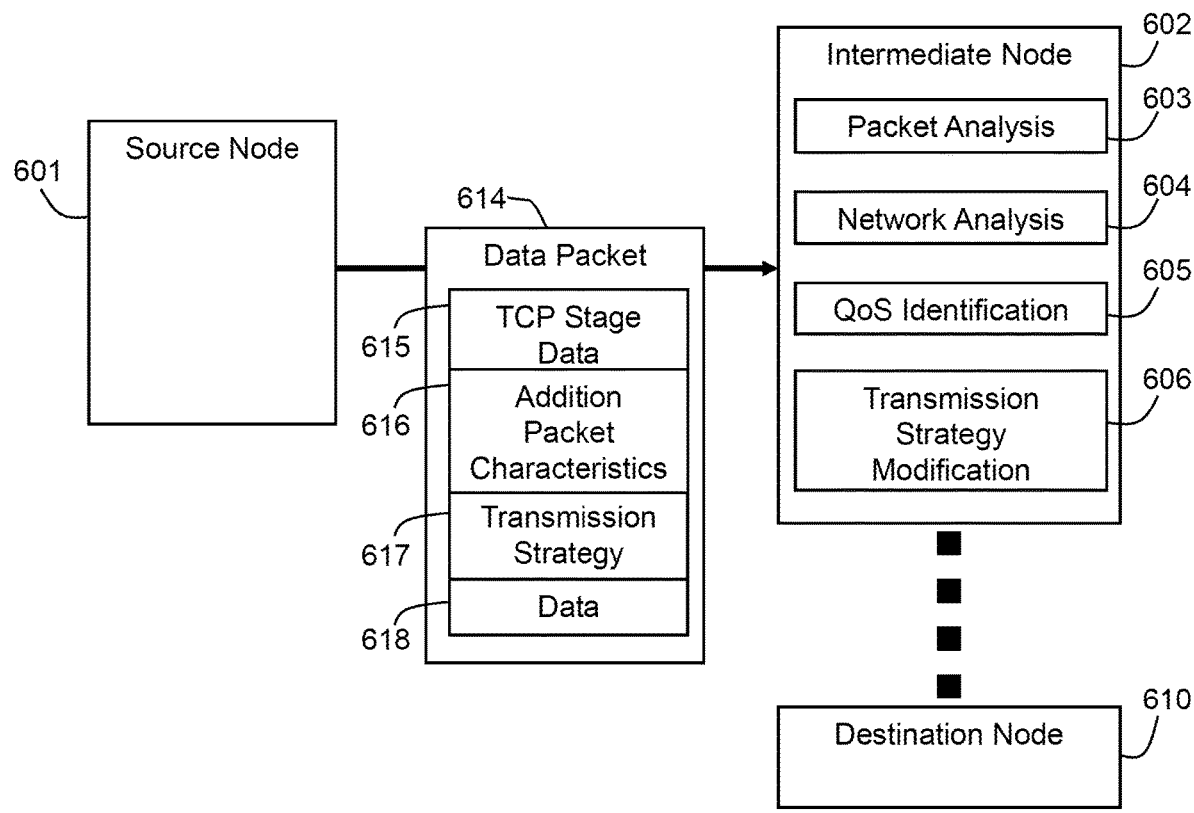
FIGS. 6A and 6B illustrate an example set of changing transmission strategies of data packets by an intermediate node in accordance with one or more embodiments.
Figure 6B:
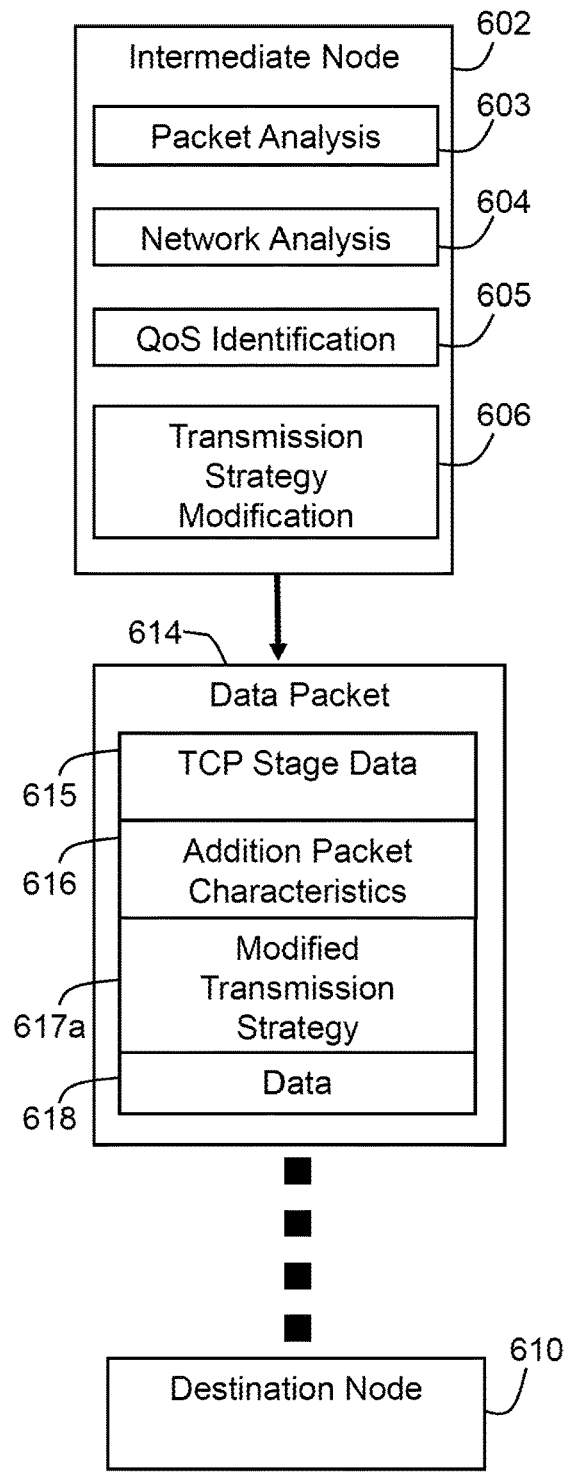

FIGS. 6A and 6B illustrate an example of modification of data packet transmission strategies by an intermediate node according to one embodiment.

A source node 601 generates a data packet 614 and transmits the data packet to an intermediate node 602. The data packet includes TCP stage data 615, additional packet characteristic data 616, transmission strategy data 617, and body data 618 that is to be used by an application at the destination node 410. The data packet 614 may correspond to the data packet 400 of FIG. 4, for example. The TCP stage data may include data indicating a TCP stage associated with the data packet 614. The TCP stage may be a "slow-start" stage or a "congestion avoidance" stage. The TCP stage may further be one of a logarithmically-increasing congestion-window stage, a linearly-increasing congestion-window stage, and a plateau stage, in which the congestion window remains at a constant size. The TCP stage data 615 may include a congestion window (CWND) value or another value indicating the TCP stage associated with the data packet 614. The additional packet characteristics 616 may include one or more of: a position of the data packet 614 within a data flow, a length of a data flow associated with the data packet 614, a priority level of the data packet 614, and a QoS associated with the data packet 614.

The data packet 614 includes a field 617 to set a transmission strategy associated with data packet acceleration techniques for the data packet 614. Examples of values stored in the transmission strategy field include values associated with: (a) a priority level for the packet, (b) a redundancy value indicating whether a redundant copy of the packet has been generated, or should be generated by a subsequent node, and (c) a transmission path value indicating whether the packet should be directed along a particular transmission path through the network. While these are provided by way of example, embodiments encompass any data packet transmission characteristics that indicate how the data packet has been handled, or how the packet should be handled, in the network.

The data packet 614 also includes data 618 that is destined for the destination node 610, to be used by the destination node 610 in one or more processes or applications. In one or more embodiments, the data packet 614 includes a field indicating a type of the data 618, such as video data, voice data, text-messaging-type data, application data, etc.

The intermediate node 602 receives the data packet 614. The intermediate node 602 includes a packet analysis module 603 to analyze the data packet 614. For example, the packet analysis module 603 may analyze the TCP stage data 615 and additional packet characteristics 616 to determine whether the data packet 614 belongs to a short-lived data packet flow or a long-lived data packet flow. The packet analysis module 603 may further determine or estimate a position of the data packet 614 in a data packet flow.

The intermediate node 602 includes a network analysis module 604 to analyze network conditions. The intermediate node 602 also includes a QoS identification module 605 that reads the packet header to identify a QoS requirement for the data packet 614.

The intermediate node 602 includes a transmission strategy modification module 606. The transmission strategy modification module 606 receives the information generated by the packet analysis module 603 and one or both of the network analysis module 604 and the QoS identification module 605 to determine whether to modify the transmission strategy 617 of the data packet 614.

Referring to FIG. 6B, the transmission strategy modification module 606 determines that the data packet 614 is associated with a short-lived data packet flow and the TCP stage is an exponentially-increasing congestion-window sub-stage of a slow-start TCP stage. Accordingly, the transmission strategy modification module 606 modifies the transmission strategy 617a of the data packet 614 and transmits the data packet 614 to a next node in the data communication network toward the destination node 410.

10. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

11. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

12. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
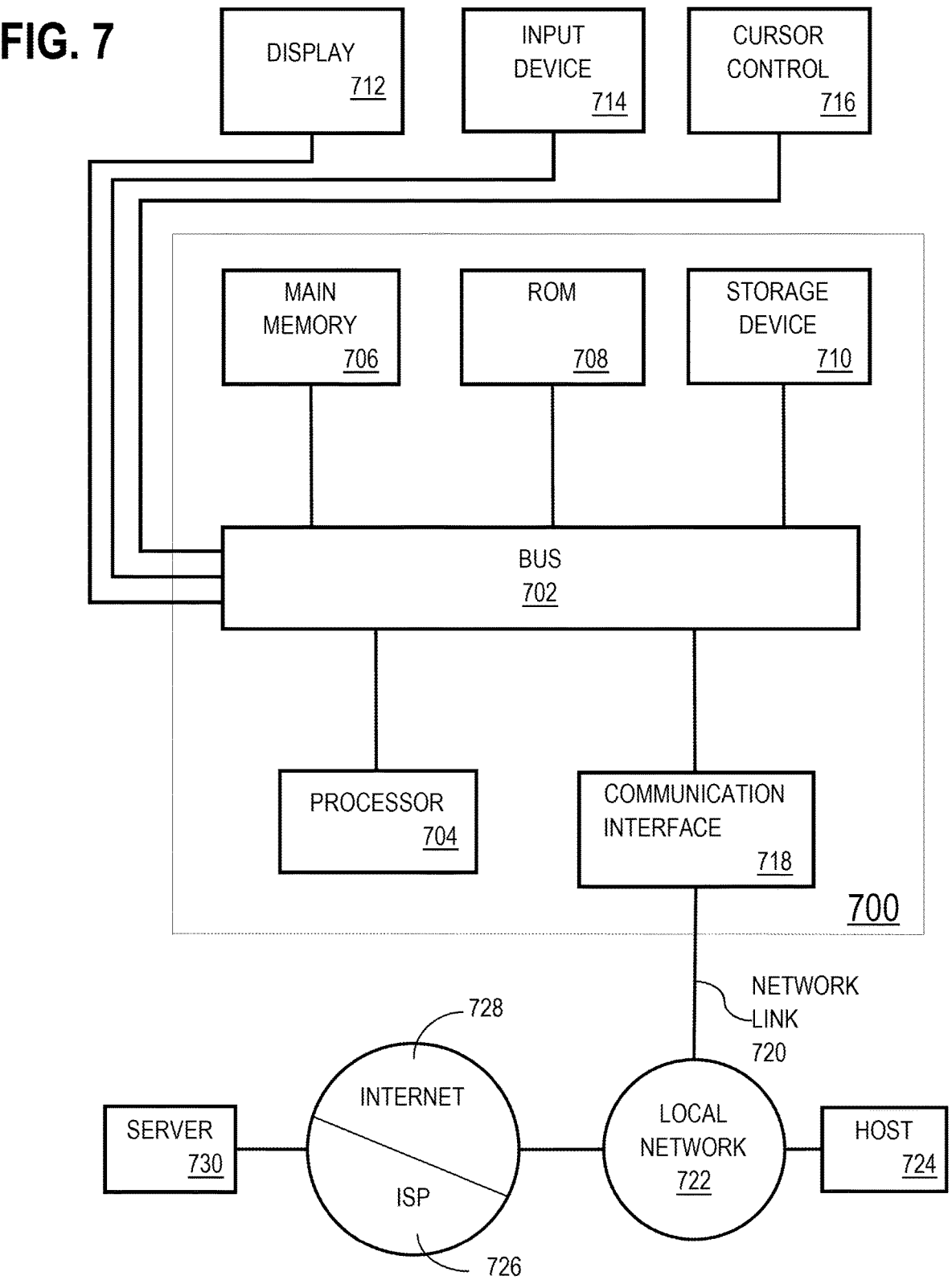
FIG. 7 is a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general-purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
    determining, by an intermediate node on a data transmission path, a first transmission control protocol (TCP) stage associated with a first data packet being transmitted from a source node on the data transmission path to a destination node on the data transmission path;
    based on determining the first TCP stage corresponds to a slow-start stage, defined by a congestion window value that is increased at a first rate based on receiving acknowledgement messages from a destination node: selecting a first transmission strategy for transmitting, by the intermediate node, the first data packet to another node along the data transmission path;
    transmitting, by the intermediate node, the first data packet in accordance with the first transmission strategy;
    determining, by the intermediate node on the data transmission path, a second TCP stage associated with a second data packet received at the intermediate node;
    based on determining the second TCP stage corresponds to a congestion-avoidance stage, defined by a congestion window value that is increased at a second rate based on receiving acknowledgement messages from the destination node: selecting a second transmission strategy for transmitting, by the intermediate node, the second data packet; and
    transmitting, by the intermediate node, the second data packet in accordance with the second transmission strategy,
    wherein the first transmission strategy is different than the second transmission strategy,
    wherein the first transmission strategy corresponds to a first ratio of proactive data acceleration techniques to reactive data acceleration techniques,
    wherein the second transmission strategy corresponds to a second ratio of proactive data acceleration techniques to reactive data acceleration techniques, and
    wherein the first ratio is greater than the second ratio.

2. The non-transitory computer readable medium of claim 1, wherein the first data packet and the second data packet belong to a same particular data flow.

3. The non-transitory computer readable medium of claim 2, wherein a TCP stage of the particular data flow is modified, subsequent to transmission of the first data packet, from the first TCP stage to the second TCP stage.

4. The non-transitory computer readable medium of claim 1, wherein the first TCP stage and the second TCP stage define a different number of maximum unacknowledged packets that may be transmitted by the source node prior to receiving an acknowledgement message from the destination node.

5. The non-transitory computer readable medium of claim 1, wherein proactive data packet acceleration techniques include:
    generating a redundant data packet associated with a particular data packet, and transmitting the particular data packet and the redundant data packet to the destination node; and
    wherein reactive data packet acceleration techniques include:
    re-transmitting one or more data packets from the source node to the destination node based on determining that an acknowledgement message associated with the one or more data packets was not received by the source node within a predetermined period of time.

6. The non-transitory computer readable medium of claim 1, wherein the operations further comprise:
    identifying a first estimated duration of time of a first data flow associated with the first data packet; and
    selecting the first transmission strategy based on the first TCP stage and the estimated duration of first data flow.

7. The non-transitory computer readable medium of claim 6, wherein the operations further comprise:

determining, by the intermediate node, a third TCP stage associated with a third data packet received at the intermediate node;

identifying a second data flow associated with the third data packet;

estimating a second estimated duration of time between initiating the second data flow and terminating the second data flow;

selecting a third transmission strategy for transmitting the third data packet from the intermediate node based on the third TCP stage and the second estimated duration of time; and transmitting the third data packet in accordance with the third transmission strategy, wherein the first data flow and the second data flow are different data flows, wherein the first TCP stage is the same as the third TCP stage, wherein the first estimated duration of time is different from the second estimated duration of time, and wherein the first transmission strategy is different than the third transmission strategy.

8. The non-transitory computer readable medium of claim 7, wherein the first estimated duration of time is shorter than the second estimated duration of time, and wherein the first transmission strategy is more aggressive than the third transmission strategy.

9. The non-transitory computer readable medium of claim 1, wherein the operations further comprise:

determining a quality of service (QoS) requirement for the first data packet; and selecting the first transmission strategy based on the first TCP stage and the QoS requirement.

10. The non-transitory computer readable medium of claim 1, wherein the operations further comprise:

determining an estimated round trip time (RTT) associated with the data transmission path; and selecting the first transmission strategy based on the first TCP stage and the RTT.

11. The non-transitory computer readable medium of claim 1, wherein selecting the first transmission strategy comprises applying a machine learning model to a data set associated with the first data packet to generate the first transmission strategy;

wherein the operations further comprise:

training the machine learning model to generate transmission strategies for data packets, the training comprising:

obtaining training data sets of historical data packet transmission data, each training data set comprising one or more of:

attributes of the data packets including TCP stages associated with the data packets; and historical transmission strategies associated with respective data packets; and training the machine learning model based on the training data sets.

12. The non-transitory computer readable medium of claim 1, wherein the operations further comprise:

analyzing, by the intermediate node, a congestion window value of the first data packet to determine the first TCP stage associated with the first data packet.

13. A method, comprising:

determining, by an intermediate node on a data transmission path, a first transmission control protocol (TCP) stage associated with a first data packet being transmitted from a source node on the data transmission path to a destination node on the data transmission path;

based on determining the first TCP stage corresponds to a slow-start stage, defined by a congestion window value that is increased at a first rate based on receiving acknowledgement messages from a destination node: selecting a first transmission strategy for transmitting, by the intermediate node, the first data packet to another node along the data transmission path;

transmitting, by the intermediate node, the first data packet in accordance with the first transmission strategy;

determining, by the intermediate node on the data transmission path, a second TCP stage associated with a second data packet received at the intermediate node;

based on determining the second TCP stage corresponds to a congestion-avoidance stage, defined by a congestion window value that is increased at a second rate based on receiving acknowledgement messages from the destination node: selecting a second transmission strategy for transmitting, by the intermediate node, the second data packet; and transmitting, by the intermediate node, the second data packet in accordance with the second transmission strategy, wherein the first transmission strategy is different than the second transmission strategy, wherein the first transmission strategy corresponds to a first ratio of proactive data acceleration techniques to reactive data acceleration techniques, wherein the second transmission strategy corresponds to a second ratio of proactive data acceleration techniques to reactive data acceleration techniques, and wherein the first ratio is greater than the second ratio.

14. The method of claim 13, wherein the first data packet and the second data packet belong to a same particular data flow.

15. The method of claim 14, wherein a TCP stage of the particular data flow is modified, subsequent to transmission of the first data packet, from the first TCP stage to the second TCP stage.

16. The method of claim 13, wherein the first TCP stage and the second TCP stage define a different number of maximum unacknowledged packets that may be transmitted by the source node prior to receiving an acknowledgement message from the destination node.

17. The method of claim 13, wherein proactive data packet acceleration techniques include:

generating a redundant data packet associated with a particular data packet, and transmitting the particular data packet and the redundant data packet to the destination node; and wherein reactive data packet acceleration techniques include:

re-transmitting one or more data packets from the source node to the destination node based on determining that an acknowledgement message associated with the one or more data packets was not received by the source node within a predetermined period of time.

18. The method of claim 13, further comprising:

identifying a first estimated duration of time of a first data flow associated with the first data packet; and selecting the first transmission strategy based on the first TCP stage and the estimated duration of first data flow.

19. A system comprising:

one or more processors; and memory storing instructions that, when executed by the one or more processors, cause the system to:

determining, by an intermediate node on a data transmission path, a first transmission control protocol (TCP) stage associated with a first data packet being transmitted from a source node on the data transmission path to a destination node on the data transmission path;

based on determining the first TCP stage corresponds to a slow-start stage, defined by a congestion window value that is increased at a first rate based on receiving acknowledgement messages from a destination node: selecting a first transmission strategy for transmitting, by the intermediate node, the first data packet to another node along the data transmission path;

transmitting, by the intermediate node, the first data packet in accordance with the first transmission strategy;

determining, by the intermediate node on the data transmission path, a second TCP stage associated with a second data packet received at the intermediate node;

based on determining the second TCP stage corresponds to a congestion-avoidance stage, defined by a congestion window value that is increased at a second rate based on receiving acknowledgement messages from the destination node: selecting a second transmission strategy for transmitting, by the intermediate node, the second data packet; and transmitting, by the intermediate node, the second data packet in accordance with the second transmission strategy, wherein the first transmission strategy is different than the second transmission strategy, wherein the first transmission strategy corresponds to a first ratio of proactive data acceleration techniques to reactive data acceleration techniques, wherein the second transmission strategy corresponds to a second ratio of proactive data acceleration techniques to reactive data acceleration techniques, and wherein the first ratio is greater than the second ratio.

20. The system of claim 19, wherein proactive data packet acceleration techniques include:

generating a redundant data packet associated with a particular data packet, and transmitting the particular data packet and the redundant data packet to the destination node; and wherein reactive data packet acceleration techniques include:

re-transmitting one or more data packets from the source node to the destination node based on determining that an acknowledgement message associated with the one or more data packets was not received by the source node within a predetermined period of time.

* * * * *